July 29, 1924.
C. H. MILES, JR
1,503,129
WHEEL PULLER
Filed May 1, 1923
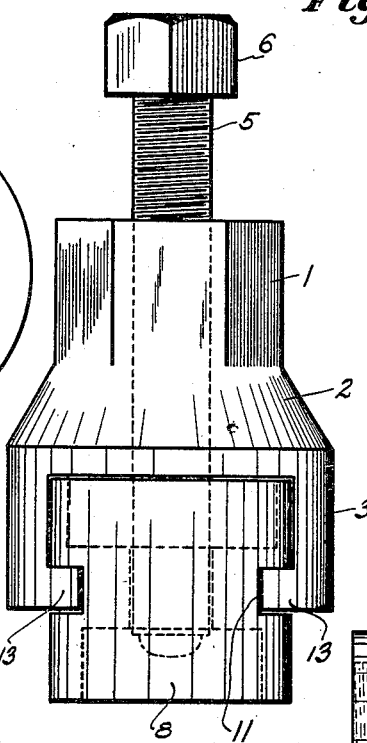
Fig. 1
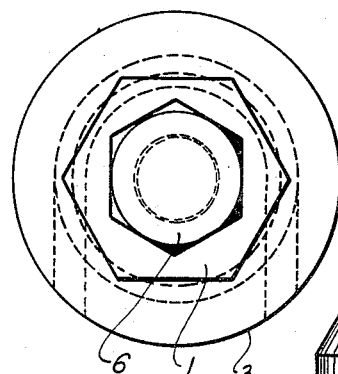
Fig. 2
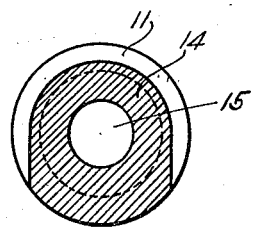
Fig. 6
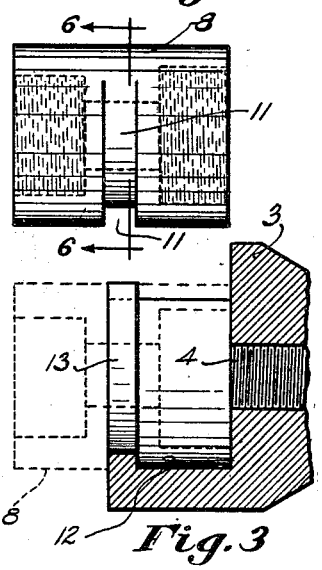
Fig. 4
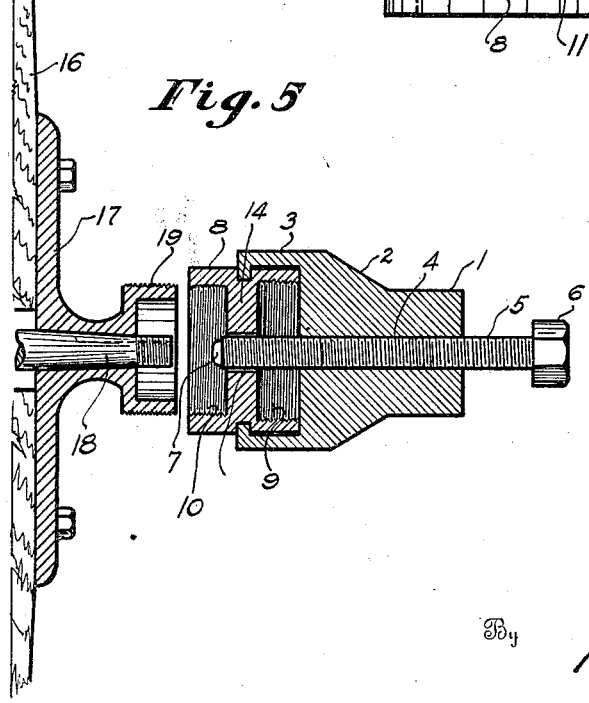
Fig. 5
Fig. 3
Inventor
CHAS. H. MILES, JR.
By
Attorney Patented July 29, 1924.

1,503,129

UNITED STATES PATENT OFFICE.

CHARLES H. MILES, JR., OF BIRMINGHAM, ALABAMA.

WHEEL PULLER.

Application filed May 1, 1923. Serial No. 635,830.

*To all whom it may concern:*

Be it known that I, CHARLES H. MILES, Jr., a citizen of the United States of America, residing at Birmingham, in the county of Jefferson and State of Alabama, have invented certain new and useful Improvements in Wheel Pullers, of which the following is a specification.

My invention relates to a device for pulling wheels from shafts or axles upon which they are mounted.

My invention is more particularly adapted for the pulling of automobile wheels from the taper axle upon which they are pressed, though obviously, by increasing the size and strength of the apparatus, it may be adapted to pull railroad car wheels from their axles.

My invention contemplates the combination of a socket member threaded to engage the hub of the wheel to be drawn and adapted to detachably interlock with a chuck which is formed with a tool grip and provided with a screw adapted to pass loosely through the socket. The socket is preferably reversible in the chuck and provided at its ends with threaded recesses or wheel engaging elements of different diameter to adapt each of my improved sockets for use with wheels having different hub dimensions.

My invention also contemplates utilizing the chuck screw as a means for holding the socket in interlocked relation with the chuck so that, by means of a wrench applied to the chuck, the socket can be screwed home on the wheel hub or unscrewed therefrom.

My invention contemplates the provision of the socket with an intermediate recessed seat presenting on opposite sides straight parallel walls which are adapted to interlock snugly with correspondingly shaped shoulders at the outer end of a socket receiving recess in the chuck.

My invention also comprises the novel details of construction and arrangements of parts, which in their preferred embodiment only are illustrated in the accompanying drawings which form a part of this specification, and in which:—

Fig. 1 shows the complete wheel puller in upright position.

Fig. 2 is a plan view of Fig. 1.

Fig. 3 is a sectional view of the chuck in operating position with the hub engaging socket shown in dotted lines.

Fig. 4 shows the hub engaging socket withdrawn from the chuck.

Fig. 5 is a cross-section of the hub and wheel puller illustrating the manner of assembling the latter.

Fig. 6 is a cross-section taken on the line 6—6 of Fig. 4.

Similar reference numerals refer to similar parts throughout the drawings.

As illustrated, I show a suitable body with a hexagonal head 1, a tapered portion 2 and a chuck 3. Through the body is tapped an axial hole 4 threaded to receive the screw 5 which is provided with a hex head 6 at one end and a shaft or axle engaging tip 7 at the other end.

There may be provided for each chuck a set of sockets, one of which is shown in the drawings. These sockets 8 are cylindrical in shape and are provided at each end with a threaded countersunk recess 9 or 10. These recesses are of different diameters and the threads are, if necessary, of a different pitch so they will fit two sizes of wheel hubs. A groove 11 is cut about the middle of the socket 8, said groove being of uniform depth around one half of its circumference and tapering off at a tangent from opposite sides, as is better illustrated in Fig. 6. The chuck portion of the wheel puller is formed with the recess 12 which is circular in shape about one half of its inside circumference and provided with a straight side opening to permit the entrance of the hub engaging socket. The chuck shoulder 13 co-acts with the socket groove 11 and serves to hold the socket interlocked with the chuck against relative longitudinal or rotating movement though permitting a lateral movement of the socket to disengage it from the chuck.

Between the recesses 9 and 10 in each socket 8 is left a web 14 having a central aperture 15, unthreaded and aligning with the screw hole 4 when the socket is mounted in the chuck. The screw 5 will pass freely through this web aperture 15 and hence will hold the socket interlocked with the chuck. By backing the screw out of the chuck recess 12 the desired socket 8 can be inserted in the chuck or the one in place reversed.

I show my invention adapted to pull an automobile wheel 16 by its hub flange 17 from the axle 18. The hub flange has a threaded end 19 adapted to receive the hub cap and also adapted to screw into the socket recess 10, when the screw 5 will be in position to engage the axle 18 as it is screwed in through the chuck body and will act to pull the wheel off the axle. The socket can be screwed on the hub flange by applying a wrench to the hex portion 1 of the chuck body and turning it with the socket 8 interlocked therewith for rotation, due to the fact that the straight sides of its groove 11 will not permit it to rotate in but only with the chuck.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. A wheel puller comprising a chuck having a laterally opening recess, a screw working longitudinally through said chuck and recess, a socket member removably mounted in said recess, means to interlock said socket with the chuck against relative longitudinal movement, and means on the socket to engage a wheel hub, there being a central aperture in the socket for the passage of said screw.

2. A wheel puller in accordance with claim 1, in which said socket is reversible and has means at its ends to engage different sized wheel hubs.

3. A wheel puller in accordance with claim 1, in which the chuck is provided with a tool grip and interlocks with the socket to cause the latter to rotate with the chuck, said socket having screw means to engage the wheel hub.

4. In a wheel puller, in combination, a chuck having an axial threaded bore, a tool grip at one end and a recess at the other end with socket engaging shoulders, a socket adapted to be moved into said recess and into interlocked engagement with said chuck shoulder, said chuck and socket having their engaging portions adapted to unlock them for joint rotation, said socket having threaded seats of different diameters at its opposite ends, a center aperture aligning with the threaded opening in the chuck, and a screw engaged in the chuck opening and adapted to pass freely through said aperture in the socket in position to engage a wheel axle when the socket is in threaded engagement with the hub on said axle.

5. A wheel puller comprising a body having a plunger mounted therein and associated with means adapted to force the plunger axially through said body, and a socket member detachable from the body and internally threaded to screw on the hub to be pulled, said member and body having interlocking parts to prevent relative movement axially of the plunger while pulling a wheel, and said socket having different sized threads at opposite ends and being adapted to be interlocked with said body with either end exposed.

In testimony whereof I affix my signature.

CHARLES H. MILES, Jr.

Witness:
NOMIE WELSH.